Jan. 20, 1931.  R. H. CHILTON  1,789,727

SPRING SHACKLE

Filed Sept. 9, 1927

Inventor
Ralph H. Chilton
Spencer Hardman & Fehr
his Attorneys

Patented Jan. 20, 1931

1,789,727

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

SPRING SHACKLE

Application filed September 9, 1927. Serial No. 218,558.

This invention relates to flexible coupling members, especially such as are adapted for use as spring shackles for automobiles.

An object of this invention is to provide an improved form of flexible coupling of vulcanized rubber and fabric material having the advantages of economy of manufacture, efficiency of operation, and long life.

Reference is made to my copending prior applications, Serial Nos. 141,787 filed Oct. 15, 1926, 141,788 filed Oct. 15, 1926 and 187,837 filed April 30, 1927.

An object of the present invention is to combine certain features found in these prior applications with other features to provide an improved form of spring shackle. For instance, the general dumb-bell form of this present shackle is similar to that of Serial Nos. 141,787 and 141,788, however it has no central metal insert nor metal exterior clamping members for retaining the molded unit in dumb-bell form. A feature of this invention is the exterior rubberized textile belt surrounding and retaining the central neck portion of the dumb-bell and vulcanized in place to form an integral whole. Thus there are no exterior rigid metal members to chafe or wear the rubberized fabric casing of the molded unit, and no possible crevices into which sand or other foreign particles may find lodgment and cause rapid deterioration.

Another feature of this invention is the relatively stiff elastic rubber and fabric core portion of the molded unit for yieldably resisting compression loads and substantially maintaining the form of the molded unit.

Further objects and advantages of the present invention will be apparent from the following description, reference being had to the accompanying drawings wherein a preferred embodiment of one form of the present invention is clearly shown.

Numerals 10 and 11 designate the two relatively movable members connected by the shackle, 10 being the chassis side rail or a fitting rigidly connected thereto and 11 the projecting end of the longest leaf of the spring 12.

Figure 1:
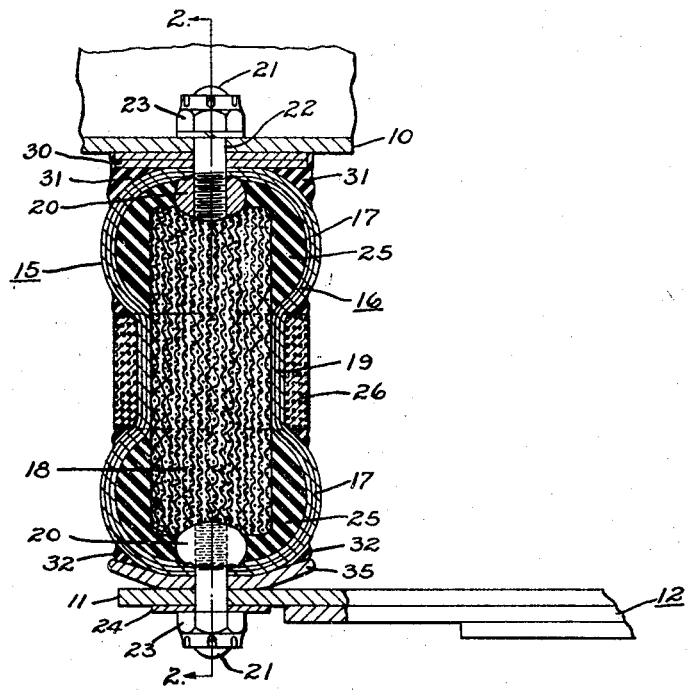
Fig. 1 illustrates a shackle built according to this invention mounted on the rear end of the front spring of an automobile chassis. The vertical section is taken on line 1—1 of Fig. 2.
Figure 2:
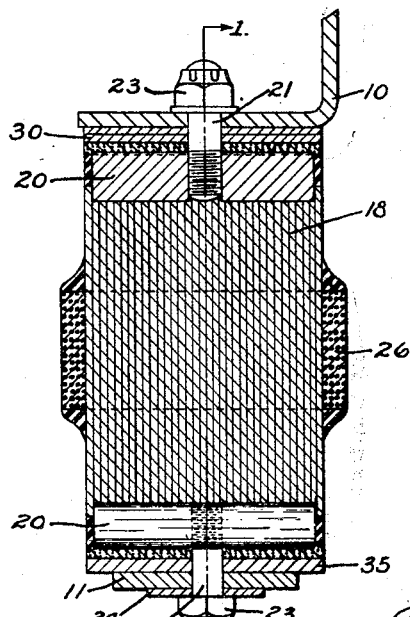
Fig. 2 is a transverse section taken on line 2—2 of Fig. 1.

The molded unit, indicated as a whole by 15, comprises an endless rubberized fabric casing 16 which preferably is composed of a plurality of turns of rubberized cord fabric wrapped with the non-extensible cords thereof extending in a peripheral direction. This flexible casing 16 is provided with the molded in situ metal clamping inserts 20 having shanks 21, preferably rigidly riveted or threaded thereto, projecting outwardly through apertures in casing 16, as clearly shown. Casing 16 is molded substantially in the form of a dumb-bell, as clearly shown in Fig. 1, with flexible oval shaped loops 17 at the ends thereof. A very stiff rubber and fabric core portion 18 bears at its opposite ends upon the metal insert bars 20 and serves as a slightly elastic compression resisting member for sustaining the compression load upon the shackle. This portion 18 is preferably of the full transverse width of the casing 16 (see Fig. 2) and completely fills the neck portion 19 of this casing 16 as clearly shown in Fig. 1. The remaining space within the flexible end loops 17 is filled with a relatively soft elastic rubber 25 vulcanized in place to all the contacting parts.

Around the outside of the neck portion 19 of the casing 16 several layers of substantially non-extensible rubberized cord fabric is wrapped to form an exterior belt 26 which binds the neck portion 19 of casing 16 firmly up against the stiff rubber and fabric core portion 18 and so renders the central portion of the molded unit 15 substantially rigid and capable of supporting the loads upon the shackle without material distortion.

At the upper end of the molded unit 15 a relatively stiff rubberized fabric seat 30 is molded in place and the wedge-shaped spaces between the seat 30 and the flexible loops 17 filled with soft rubber 31. A similar fabric seat may be also provided at the lower end of unit 15, but this is not necessary when a slightly concave metal seat, as shown at 35, is provided. Preferably the soft rubber wedge-shaped cushions 32 are molded to the exterior surface of the lower flexible loop 17 to properly cushion the casing 16 from the metal seat 35 during the swinging movement of the molded unit and to also prevent sand or foreign matter from finding lodgment in the space.

This molded unit, made as above described, is vulcanized as a whole in a die mold, with the metal clamping inserts 20 properly fixed in place in the mold, and all the fabric and rubber portions are firmly bonded together by the vulcanization. In order to get the desired degree of stiffness in the core portion 18, this part may be first built up of rubber and fabric plies and semi-vulcanized before being used to build up the unit 15 as described above.

In order to assemble the unit 15 in place between the parts 10 and 11, the upper shank 21 is inserted through a hole 22 in part 10 and nut 23 applied to the projecting threaded end of shank 21. It will be obvious that by setting up nut 23 very tight the upper end of the flexible loop 17 and the fabric seat 30 will be clamped in fixed relation to part 10. The lower shank 21 is inserted through holes in the concave seat member 35 and the spring end 11, the washer 24 applied, and then the lower nut 23 set up tight to firmly clamp these parts to the spring end 11.

In operation, the substantially rigid mid-portion of the molded unit 15 swings angularly in a direction longitudinally of spring 12 to permit the to and fro movement of the spring end 11. The end loops 17 and the soft rubber portions 25 are sufficiently flexible to easily permit the required pivoting of unit 15 at each end thereof. The soft rubber cushions 31 and 32 yieldably cushion the end loops 17 upon the stationary seats 30 and 35, and also prevent mud, dirt, gravel, etc. from entering the wedge-shaped spaces occupied thereby. The slightly yieldable core portion 18 substantially maintains the form of the molded unit at all times, that is, it limits the distortion thereof due to its hardness and strength under compression, while at the same time it permits easy pivotal movement at the ends of the molded unit.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members and having a molded rubber and fabric swinging element comprising: a flexible rubberized fabric casing, two metal clamping inserts at opposite portions of said casing for fixing said portions to said relatively movable members respectively, elastic rubber and fabric material filling said casing, and an exterior rubberized fabric belt surrounding the mid-section of said swinging element, all the portions of said swinging element being vulcanized together to form an integral whole.

2. A spring shackle connecting the end portion of a leaf spring to a member supported thereby and having a molded rubber and fabric swinging element comprising: a flexible rubberized fabric casing molded substantially in the form of a dumb-bell, elastic rubber and fabric material filling the interior of said casing, and an exterior rubberized fabric belt confining the neck portion of said dumb-bell, all the portions of said swinging element being vulcanized together to form an integral whole.

3. A spring shackle connecting the end portion of a leaf spring to a member supported thereby and having a molded rubber and fabric swinging element comprising: a flexible rubberized fabric casing molded in dumb-bell form, a relatively stiff rubber and fabric compression resisting portion extending longitudinally within said dumb-bell casing, relatively soft and elastic rubber material filling the end loops of said dumb-bell casing, and an exterior rubberized fabric belt confining the central portion of said swinging element.

4. A spring shackle connecting the end portion of a leaf spring to a member supported thereby and having a molded rubber and fabric swinging element comprising: a relatively stiff core built up from a plurality of layers of rubberized fabric, relatively soft rubber surrounding the end portions of said core, a flexible rubberized fabric casing molded in dumb-bell form about said core and soft rubber, and an exterior rubberized fabric belt confining the central portion of said swinging element.

5. An extension shackle connecting two relatively movable members and having a molded rubber and fabric swinging element comprising: a flexible rubberized fabric casing, two metal clamping inserts at opposite end portions of said casing for fixing said portions to said relatively movable members respectively, compression resisting elastic material within said casing, and an exterior rubberized fabric belt surrounding and confining the central portion of said swinging element, said portions of said swinging element being vulcanized together to form an integral unit.

6. An extension shackle connecting two relatively movable members and having a molded rubber and fabric swinging element comprising: a flexible rubberized fabric casing molded substantially in the form of a dumb-bell, elastic rubber material within said casing, and an exterior laterally wound rubberized fabric belt confining the neck portion of said dumb-bell, all said portions of said swinging element being vulcanized together to form an integral unit.

7. An extension shackle connecting two relatively movable members and having a molded rubber and fabric swinging element comprising: a flexible rubberized fabric casing, two metal clamping inserts molded in situ at opposite end portions of said casing for fixing said portions to said relatively movable members respectively, a relatively stiff rubber and fiber compression resisting portion extending substantially between said metal inserts within said casing, relatively soft and elastic rubber material completing the filling of the end portions of said casing, and means exterior of said casing for confining the central portion of said swinging element.

In testimony whereof I hereto affix my signature.

RALPH H. CHILTON.